US012718288B2

(12) United States Patent
Bruno et al.

(10) Patent No.: US 12,718,288 B2
(45) Date of Patent: Aug. 25, 2026

(54) INDIVIDUALIZED CONTEXTUAL EXPERIENCES

(71) Applicant: Wells Fargo Bank, N.A., San Francisco, CA (US)

(72) Inventors: John Bruno, Scottsdale, AZ (US); Sean Edward Falese, Jenkintown, PA (US); Arnaud Versini, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 241 days.

(21) Appl. No.: 18/329,699

(22) Filed: Jun. 6, 2023

(65) Prior Publication Data

US 2023/0368288 A1 Nov. 16, 2023

Related U.S. Application Data

(63) Continuation-in-part of application No. 17/663,572, filed on May 16, 2022.

(51) Int. Cl.
*G06Q 40/02* (2023.01)

(52) U.S. Cl.
CPC .................................... *G06Q 40/02* (2013.01)

(58) Field of Classification Search
USPC ............................................................ 705/35
See application file for complete search history.

(56) References Cited

U.S. PATENT DOCUMENTS 8,700,512 B1 * 4/2014 Kuznetsov ............. G06Q 40/00 705/35
8,880,648 B1 * 11/2014 Arora ............... H04N 21/43637 709/229
9,001,819 B1 * 4/2015 Or-Bach ............ H04L 65/4015 370/352
9,047,618 B2 * 6/2015 Dharmaji ........... G06Q 30/0273
(Continued)

FOREIGN PATENT DOCUMENTS

WO 2018/097928 A1 5/2018
WO 2020/118457 A1 6/2020

OTHER PUBLICATIONS

A. Yassine, "Future communication services: Application enablement and the role of software agent architectures," in Bell Labs Technical Journal, vol. 16, No. 2, pp. 271-276, Sep. 2011 (Future).*
(Continued)

*Primary Examiner* — Chikaodinaka Ojiaku
(74) *Attorney, Agent, or Firm* — Merchant & Gould P.C.

(57) ABSTRACT

An example system can include: at least one processor; and non-transitory computer-readable storage storing instructions that, when executed by the at least one processor, cause the system to: provide an individualized contextual module programmed to capture individual information associated with a user, the individual information including personal information about the user; provide an artificial intelligence module programmed to use artificial intelligence to tailor an experience for the user based upon the personal information; and provide a sub-component assembly module programmed to select sub-components based upon the experience to generate a contextual interface for the user.

6 Claims, 6 Drawing Sheets

(56) References Cited

U.S. PATENT DOCUMENTS 9,713,118 B1 * 7/2017 DeLuca .................. H04L 67/52
9,983,775 B2 * 5/2018 Jain .......................... G06F 9/451
10,237,144 B2 * 3/2019 Yoon ................... H04L 41/5025
10,636,085 B1 * 4/2020 Lovett .................... G06Q 40/02
10,719,122 B2 * 7/2020 Marti .................... H04L 67/535
10,726,334 B1 * 7/2020 Elnahrawy ............. G06N 3/045
10,733,631 B2 * 8/2020 Flowers .................. G06F 17/18
10,796,228 B2 * 10/2020 Roberts ................. G06F 16/221
10,997,660 B1 * 5/2021 Webster ................ H04L 67/306
11,086,698 B1 8/2021 Nitsopoulos
11,137,887 B1 10/2021 Garibaldi et al.
11,139,081 B2 * 10/2021 Tran ....................... G06N 20/20
11,150,791 B1 * 10/2021 Garibaldi ............ G06F 16/9574
11,188,940 B1 * 11/2021 Vanderveld ........ G06Q 30/0255
11,227,269 B2 * 1/2022 Collares ................. G06N 20/00
11,321,614 B2 * 5/2022 Roberts .................... G06N 5/01
11,381,331 B2 * 7/2022 Akimoto ................ G06N 20/20
11,411,800 B1 8/2022 Murugesan et al.
11,442,445 B2 * 9/2022 Cella ........................ A01B 3/02
11,538,048 B1 * 12/2022 Nahta .................. G06N 3/0985
11,561,666 B1 * 1/2023 Paramasamy .......... G06Q 40/03
11,854,013 B1 * 12/2023 Costilla .................. G06Q 20/10
12,099,858 B2 * 9/2024 Mishra ...................... G06F 8/38
12,131,365 B2 * 10/2024 Forsyth ............... G06F 16/9535
12,229,781 B2 * 2/2025 Allbright ............... G06N 20/00
12,387,145 B2 * 8/2025 Dickie ..................... G06N 5/01
12,493,479 B2 * 12/2025 Premkrishna ........... G06F 9/451
2007/0255653 A1 11/2007 Tumminaro et al.
2007/0294229 A1 * 12/2007 Au ........................ G06F 16/951
2008/0172622 A1 * 7/2008 Roche ..................... G06F 16/25 715/762
2010/0146536 A1 * 6/2010 Craner ............... H04N 21/4542 725/28
2010/0268639 A1 * 10/2010 Feinstein ............... G06Q 40/00 705/38
2013/0097464 A1 * 4/2013 Ahmad ............... G06F 11/0751 714/E11.144
2013/0174223 A1 * 7/2013 Dykeman ............... G06F 21/10 726/4
2013/0325340 A1 * 12/2013 Forstall .............. G01C 21/3667 715/810
2014/0108214 A1 * 4/2014 Kuznetsov ............. G06Q 40/00 705/35
2014/0122618 A1 * 5/2014 Duan ...................... H04L 51/02 709/206
2014/0344128 A1 * 11/2014 Nikankin ............... G06Q 40/00 705/35
2014/0359127 A1 * 12/2014 Linares ............... H04L 41/0816 709/226
2015/0033134 A1 * 1/2015 Bragstad ............. G06F 3/04847 715/736
2015/0262182 A1 * 9/2015 Gervais ................ G06Q 20/405 705/44
2015/0317147 A1 * 11/2015 Nachimuthu ............. G06F 8/65 717/173
2015/0373565 A1 * 12/2015 Safavi ................. H04L 41/5067 370/252
2015/0379581 A1 12/2015 Bruno et al.
2016/0148133 A1 * 5/2016 Haggar .............. G06Q 10/0635 705/7.14
2016/0335454 A1 11/2016 Choe et al.
2017/0052760 A1 * 2/2017 Johnson ................ A63F 13/215
2017/0230312 A1 * 8/2017 Barrett .................... H04L 51/02
2017/0262164 A1 * 9/2017 Jain ..................... G06F 3/04847
2017/0293851 A1 * 10/2017 Chawla .................. G06N 5/048
2018/0129742 A1 * 5/2018 Li ....................... G06F 16/3334
2018/0150749 A1 * 5/2018 Wu .......................... G06N 5/04
2018/0218252 A1 * 8/2018 Wu ........................ G06N 3/006
2018/0284975 A1 * 10/2018 Carrier ................ G06F 16/9535
2018/0307390 A1 * 10/2018 Fang ......................... G06F 9/44
2018/0374011 A1 * 12/2018 Barr ................... G06Q 30/0201
2019/0138177 A1 * 5/2019 D'Souza ............... G06F 3/0481
2019/0205872 A1 * 7/2019 Tourne .................. G06F 16/285
2019/0354599 A1 * 11/2019 Mital ..................... G06N 20/00
2020/0007477 A1 * 1/2020 Nair .................... H04L 65/1066
2020/0251213 A1 * 8/2020 Tran ....................... G06N 20/20
2020/0285516 A1 9/2020 Darling et al.
2020/0349169 A1 * 11/2020 Venkatesan .............. G06N 5/01
2020/0387965 A1 12/2020 Cella
2021/0035224 A1 * 2/2021 Crabtree ................ G06Q 40/08
2021/0065305 A1 * 3/2021 Stevenson ............. G06F 16/254
2021/0117571 A1 * 4/2021 Prakash ................ G06F 16/906
2021/0132962 A1 5/2021 Makhija et al.
2021/0192106 A1 6/2021 Bourhani et al.
2021/0248205 A1 * 8/2021 Tank ..................... G06F 16/986
2021/0255902 A1 * 8/2021 Soon-Shiong ........ G06F 9/5027
2021/0326396 A1 10/2021 Chugh et al.
2022/0005114 A1 * 1/2022 Nichols .................. G06Q 10/02
2022/0108069 A1 * 4/2022 Lee ....................... G06F 40/279
2022/0114214 A1 4/2022 Reddymakireddy et al.
2022/0114602 A1 * 4/2022 Horn, III ............... G06Q 10/40
2022/0207430 A1 * 6/2022 Dickie ..................... G06N 5/01
2022/0366131 A1 * 11/2022 Ekron ....................... G06F 8/34
2022/0383284 A1 12/2022 Rastogi et al.
2022/0405152 A1 12/2022 Edamadaka et al.
2023/0113765 A1 * 4/2023 Patt ................... G06F 16/24553 705/4
2024/0046333 A1 * 2/2024 Nosrati .................... G06N 3/04
2024/0078597 A1 * 3/2024 Appel .................... G06Q 40/02
2024/0087011 A1 * 3/2024 Karnik ................... G06Q 40/08
2024/0272917 A1 * 8/2024 Mishra ...................... G06F 8/38
2024/0296502 A1 * 9/2024 Patt .................... G06Q 30/0208
2024/0303094 A1 * 9/2024 Premkrishna ........... G06F 9/451
2024/0320591 A1 * 9/2024 Garvey ............... G06F 11/3438
2024/0320714 A1 * 9/2024 West ..................... G06F 16/242
2024/0411523 A1 * 12/2024 Bruno ...................... G06F 9/451
2024/0411569 A1 * 12/2024 Bruno ...................... G06F 9/451
2025/0117855 A1 * 4/2025 Pandey .................. G06Q 40/06
2025/0285036 A1 * 9/2025 Dickie ................... G06N 20/20

OTHER PUBLICATIONS

L. Zouhaier, Y. B. D. Hlaoui and L. B. Ayed, "A Reinforcement Learning Based Approach of Context-driven Adaptive User Interfaces," 2021 IEEE 45th Annual Computers, Software, and Applications Conference (COMPSAC), Madrid, Spain, 2021, pp. 1463-1468, (Reinforcement).*
U.S. Appl. No. 17/658,015, filed Apr. 5, 2022.
U.S. Appl. No. 63/268,935, filed Mar. 7, 2022.
U.S. Appl. No. 17/663,572, filed May 16, 2022.

* cited by examiner

Authoring module
202

Hub and registry module
204

Context configuration module
206

Rendering module
208

Individualized context module
402

Artificial intelligence module
404

Sub-component assembly module
406

INDIVIDUALIZED CONTEXTUAL EXPERIENCES

BACKGROUND

Users access many different types of sites to interact with businesses. These sites are programmed to provide information and desired functionality to the users. However, these sites can be difficult to create, particularly when different users have different needs and priorities. This can result in sites that may not be optimized for all users.

SUMMARY

Embodiments are directed to providing individualized contextual experiences.

According to aspects of the present disclosure, an example system can include: at least one processor; and non-transitory computer-readable storage storing instructions that, when executed by the at least one processor, cause the system to: provide an individualized contextual module programmed to capture individual information associated with a user, the individual information including personal information about the user; provide an artificial intelligence module programmed to use artificial intelligence to tailor an experience for the user based upon the personal information; and provide a sub-component assembly module programmed to select sub-components based upon the experience to generate a contextual interface for the user.

According to another aspect, an example method can include: providing an individualized contextual module programmed to capture individual information associated with a user, the individual information including personal information about the user; providing an artificial intelligence module programmed to use artificial intelligence to tailor an experience for the user based upon the personal information; and provide a sub-component assembly module programmed to select sub-components based upon the experience to generate a contextual interface for the user.

The details of one or more techniques are set forth in the accompanying drawings and the description below. Other features, objects, and advantages of these techniques will be apparent from the description, drawings, and claims.

DETAILED DESCRIPTION

Figure 1:
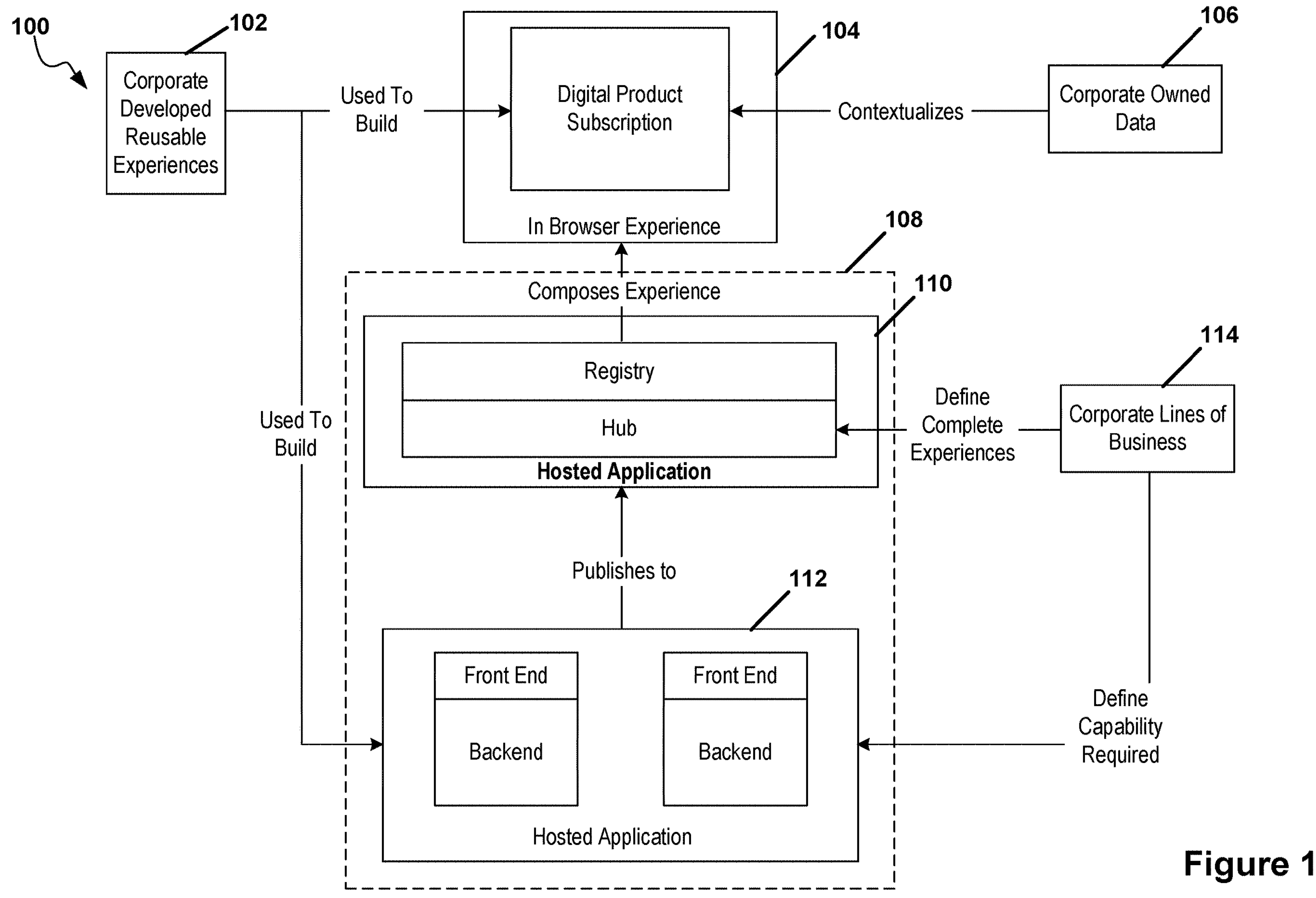
FIG. 1 shows an example system programmed to provide individualized contextual experiences.

Embodiments are directed to providing individualized contextual experiences. As described further below, these contextual experiences can be created based upon aspects associated with a user, such as the user's personas, roles and entitlements, preferences, operations, etc. In addition, the contextual experiences can be further individualized using artificial intelligence, which learns the user's preferences over time.

Enterprises with legacy monolithic applications can benefit from an approach that easily allows them to develop and publish related "micro front-ends". Technology teams across the enterprise can develop reusable "micro front-end" components for other teams to consume in building their modern applications. Each team would develop in an efficient agile manner while reducing dependencies and risk to delivering value to customers.

In examples provided herein, applications with contextual interfaces can be composed of conforming micro front-end components that are available on a hub. Tools may be leveraged to help generate conforming micro front-ends for efficient development and consistency in desired behavior.

Examples provided herein relate simplifying the development of web and mobile user experiences. The examples can standardize user experience layers and Application Programming Interface (API) integrations to provide personalized contextual interfaces for a user. The principles of the present disclosure may be implemented across various known and future experiences, including existing operating systems and applications with embedded micro front-ends.

In some examples, these contextual interfaces can be composed of smaller micro front-end components that behave and can be released independently while conforming to specified control structures and standards. In some examples, conforming micro front-end components can be offered on a hub for consumption. Micro front-end components can appear on a user interface in a variety of forms depending on the desired contextual interface.

In some examples, data known about users is leveraged to further enhance the personalized nature of the contextual interfaces. This can include composition of an aggregate digital interface through an easily consumable hub organized by common attributes and enabled for personalization.

In some examples, the contextual interfaces are provided in the financial services industry, although the interfaces can be equally applicable in other contexts.

Additional details regarding an example system including such micro front-ends are provided in U.S. patent application Ser. No. 17/663,572 filed on May 16, 2022, the entirety of which is hereby incorporated by reference.

Composite micro front-ends are comprised of a collection of "sub" micro front-ends and serve to aggregate related capability and simplify experience management. For example, a composite micro front-end may contain collection of payment related micro front-ends that support wires, ACH, and virtual card which are grouped together. These micro front-ends, in turn, may be composed of composite micro front-ends or atomic non-composite micro front-ends, all of which form an addressable micro front-end hierarchy within the individualized experience.

The relationship between a composite micro front-end and its contained "sub" micro front-ends is a design-time consideration. There may be many micro front-ends that could potentially be included in a particular composite micro front-end. The platform decides which subset to use at any given time based on the available room, template, compatibility, contextual rules and so on.

A design system is used to describe how individualized experiences will be composed at runtime by the platform. The design system specifies the collection of micro front-ends, associated templates and contextual rules that will be used by the platform in composing an experience for a particular persona, user role, entitlement and intended activity. Rules specify how and when certain micro front-ends are to appear, which must appear together or not, for which types of users and activities, which experience modalities to use, which can be personalized, where to derive and include insight micro front-ends, and so on.

This becomes a starting point for the platform, which learns preferences, behavior and "true intent" over time using artificial intelligence in order to refine and compose the correct micro front-end experiences over time for that particular user.

The examples provided herein provide a practical application of the described technologies. For instance, the examples enhance the configuration of the contextual interfaces, making them more relevant and efficient at displaying and receiving information. Further, the examples can leverage artificial intelligence to understand context when displaying information. Finally, the examples can facilitate the use and reuse of components, thereby enhancing the developmental efficiency of the contextual interfaces. Many other advantages are possible.

FIG. 1 schematically shows an example system 100 that is programmed to generate contextual interfaces using micro front-end components.

The system 100 generally includes a client device 104 and a server device 108. The components of the system 100 can include one or more computing devices, such as laptops, desktops, tablets, servers, server farms, etc. Each of the computing devices includes one or more storage media encoding instructions which, when executed by one or more processors, implement the functionality described herein.

Although multiple computing devices are shown in the system 100, the functionality described herein can be implemented on one or many computing devices. In such examples, each of the computing devices communicate with the others through a network. The network can be any suitable data network, such as the internet, a wide area network, a local area network, a wired network, a wireless network, a cellular network, a satellite network, a near field communication network, or any operatively connected combination of these.

In the example shown, the client device 104 can include a plurality of devices that numbers in the hundreds or thousands. The client device 104 is programmed to provide a contextual interface for a user of the client device 104.

The server device 108 can also include a plurality of devices, such as a server farm and/or cloud computing. In this example, the example server device 108 includes a hub device 110 and a component authoring device 112. Again, each of these devices can be implemented as a single device (e.g., all within the server device 108) and/or as multiple discrete devices within the system 100.

Generally, the example component authoring device 112 is programmed to create micro front-end components. The example hub device 110 is programmed to allow those micro front-end components to be registered and used to generate contextual interfaces at the client device 104.

More specifically, the example hub device 110 is programmed to house a plurality of micro front-end components that can be used to generate a contextual interface for a user. In these examples, the micro front-end components can be combined and reused to generate the interfaces. In some examples, the hub device 110 defines conformance criteria that dictates various aspects of the micro front-end components that are allowed to be registered at the hub device 110.

The component authoring device 112 is programmed to facilitate the authoring of these micro front-end components. This can include providing tools that facilitate the development of the micro front-end components. The tools can assist in assuring that the micro front-end components meet the conformance criteria necessary for the micro front-end components to be registered by the hub device 110. More details are provided below.

Figure 2:
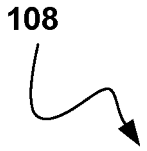
FIG. 2 shows example logical components of a server device of the system of FIG. 1.

Referring now to FIG. 2, additional details about the server device 108 are shown. In this example, the server device 108 includes an authoring module 202, a hub and registry module 204, a context configuration module 206, and a rendering module 208. Many other configurations are possible.

The example authoring module 202 is generally programmed to facilitate the creation of micro front-end components. As noted, the authoring module 202 can be accessible to developers, such as members of an organization associated with the system 100. As described further below, the organization can, in one example, be a financial institution. Developers of the financial institution can access the authoring module 202 to create micro front-end components for use in creating contextual interfaces associated with the applications provided by the financial institution to users.

In some examples, the authoring module 202 can be interactive in nature, allowing for automatic and semi-automatic (e.g., with user input) micro front-end generation. For instance, the authoring module 202 can provide wizards and pre-programmed functionality that allow for easy, semi-automatic generation of new micro front-end components.

In some examples, the authoring module 202 is programmed to assure that the micro front-end components meet conformance criteria associated with the hub device 110. Examples of such conformance criteria are described below.

Further, the authoring module 202 can be programmed to facilitate the reuse of resources as new micro front-end components are created. For instance, the authoring module 202 can be programmed to provide libraries of code that can be combined to provide desired functionality. Further, two or more existing micro front-end components can be combined in different manners to create a new micro front-end component with desired functionality. Many other configurations are possible. In some embodiments, authoring module 202 is further programmed to simplify micro front-end development and deployment by using APIs and/or database tables allowing for the automatic generation of, for example, an experience API or Graph Query Language endpoint.

The example hub and registry module 204 facilitates the registration of the micro front-end components with the hub device 110. In one non-limiting example, the hub and registry module 204 defines one or more API that allow new micro front-end components to be registered. In this example, the registration can be in the form of a JavaScript Object Notation (JSON) contract, wherein the contract defines the conformance criteria required for each micro front-end component.

For instance, example conformance criteria can include one or more of technical, design, and/or performance attributes. Conformance can relate to how the micro front-end component will interact with standard capabilities defined for the system 100. These can be broadly categorized into "control", which is used to enforce the standard capabilities, and "data", which defines the behavior of the micro front-end component.

In some examples, the hub may operate using a domain specific language and associated meta data to define a set of rules. In some embodiments, the domain specific language describes the micro front-end to the ecosystem such that the micro front-end can be accepted by the hub and integrated within experiences.

For instance, the domain specific language can provide the framework that is used to define how to render the micro front-end. Metadata can also be associated with the micro front-end to define how the micro front-end is configured to interface with the framework. Conformance of the micro front-end is derived from the metadata associated with the micro front-end's runtime characteristics. The metadata can be used to ensure that only micro front-ends meeting conformance requirements can be registered and/or deployed by the hub.

The micro front-end components can "plug" into the "control" part. For example, to adequately personalize an experience for individual users we need to respect: a) user role entitlements (e.g., can they see the micro front-end, invoke feature, limits, etc.); b) user preferences; c) artificial intelligence-derived presentment of the micro front ends components based on a variety of factors; d) active experimentation underway; and so on. See FIGS. 4 and 5 described below for more detail.

Micro front-end components can implement methods to support these and other capabilities including to exchange and respond to state transitions, gather analytical data, adjust form factors and displays, activity targeting requests, participate in experiments, feedback, deep linking, tracing, and so on.

For instance, the technical attributes can include requirements on how the micro front-end components are created, such as using specific programming languages, and risk aspects, such as how the micro front-end components address confidential information (e.g., encryption requirements). The design attributes can include requirements on the "look and feel" of the interface generated by the micro front-end components, such as particular fonts, colors, and/or other design aspects. The performance attributes can provide certain metrics on how the micro front-end components perform, such as requiring a certain rendering and processing speeds. Many other configurations are possible.

In some examples, the server device 108 allows for the definitions of user profiles. The user profiles can define particular attributes of the user that facilitate the creation of the micro front-end components. For instance, the profile of the user can define bibliographic information about the user (e.g., location, age, etc.), the user's role (e.g., job position and family environments), and the user's preferences.

Once the micro front-end components are created using the authoring module 202 and registered by the hub and registry module 204, the micro front-end components are ready to be used to create the contextual interfaces. When doing so, additional contextual information can be provided to the micro front-end components as the components are assembled for display to users.

The example context configuration module 206 is programmed to provide the additional contextual information to the micro front-end components as the components are assembled to be surfaced on a contextual interface. The contextual information is used to drive the selection of a set of micro front-ends that are composed to yield the user experience at that moment, along with data that is available to the selected set of micro front-ends. In some examples, a most relevant experience is generated for the user based on the contextual information. Once the experience is generated, the set of micro front-ends is deployed and rendered into the experience by the rendering module 208, discussed in more detail below.

For example, a unified login micro front-end may be composed that is able to leverage contextual information such as a user-id, a user device, and a user location, each of which drives an entirely differentiated experience selecting from a variety of external or internal applications for the user using the same micro front-end.

Generally, the contextual information can include data associated with the user so that the micro front-end components are assembled in a more efficient manner. This contextual information can include, without limitation, operational information and personal information, as described further below.

For instance, the system 100 can also include a reusable information device 102 and a user information device 106 that provide additional contextual information for the system 100 as the contextual interface is generated for the user.

In this example, the reusable information device 102 is programmed to enhance efficiency in the development and deployment of the micro front-end components. More specifically, the reusable information device 102 can monitor the functionality of existing micro front-end components and suggest the reuse of those micro front-end components when new functionality is being developed.

For instance, in the example with the financial institution, each line of business can define certain aggregated experiences associated with the functionality provided for users. The reusable information device 102 can suggest existing micro front-end components from the hub device 110 which can provide some or all the desired functionalities.

For example, assume a line of business is developing a user experience associated with payment of a mortgage. A different line of business may have already developed one or more micro front-end components used for payment of an automobile loan. One or more of these micro front-end components could be identified by the reusable information device 102 and used to develop the user experience associated with payments for the mortgage. Many other examples exist.

One non-limiting example of defining functionality and development according to user interactions in order to enhance the efficiencies of developing and providing products and services is described in U.S. patent application Ser. No. 17/658,015 filed on Apr. 5, 2022, the entirety of which is hereby incorporated by reference.

The example user information device 106 is programmed to provide additional information that may be unique to the user. For instance, with the example involving the financial institution, the user information device 106 can access additional details about the user, such as user preferences and user financial information, such as financial products and account balances. This information can be provided from the user information device 106 to the context configuration module 206 when selecting the micro front-end components for the contextual interface, as described further below.

In addition to accessing information from the reusable information device 102 and the user information device 106, the example context configuration module 206 can also be context-aware and use artificial intelligence, such as machine learning, to further enhance the use of the micro front-end components to generate the contextual interfaces.

For instance, the context configuration module 206 can use machine learning to understand user context. This can include prior and/or current activity associated with the system 100. For instance, a user context can be generated by the context configuration module 206 based upon what the user is currently doing. For instance, if the user is currently filling out a form on the system 100, the context configuration module 206 can access information from the user information device 106 and present micro front-end components to facilitate entry on the form, such as being pre-filled with necessary information.

Further, the context configuration module 206 can use machine learning to understand user preferences and provide that context to the rendering module 208. For instance, the context configuration module 206 can be programmed to learn about user, such as what the user wants to see, where, how, etc. For example, if the user continues to use certain functionality associated with certain micro front-end components and consistently cancels, hides, or otherwise removes other functionality, the context configuration module 206 can be programmed to use machine learning to understand those user preferences. The context configuration module 206 can provide information to the rendering module 208 to surface those micro front-end components that are more useful to the user and hide or otherwise suppress those that are not. Additional examples are provided below.

Further, the context configuration module 206 can determine preferences for the type of platforms used by the user. For instance, if the user prefers to access the system 100 via a mobile device, the context configuration module 206 can optimize the micro front-end components for mobile access. This can include changing functionality and user interface components to optimize access on a smaller screen and with different input types (e.g., touch).

In addition, the context configuration module 206 can be programmed to experiment to better understand preferences associated with individual users, groups of users, or an entire population of users. For instance, if a group of users, such as those over a certain age or having other common attributes, appears to struggle with functionality, the context configuration module 206 can be programmed to modify or suggest different micro front-end components with different functionality to address those shortcomings.

To accomplish this learning, the context configuration module 206 can experiment by suggesting different functionality and/or micro front-end components for different groups of users and determining which functionality and/or micro front-end components are preferred for particular users, groups of user, etc. Examples of such criteria for grouping of users includes: user role; preferences or likes; bibliographic commonality (e.g., age, gender, location, etc.), time of day, etc.

For instance, in one example, assume that a user accesses the system 100 every Friday afternoon to make a certain payment. Over time, the context configuration module 206 can use machine learning to identify such a trend. When the user accesses the system 100 on Friday afternoons, the context configuration module 206 can suggest the micro front-end components that facilitate the payment be surfaced by the rendering module 208 at a convenient location for the user so the user can efficiently make the payment. Many other configurations are possible.

Additional details on the context configuration module 206 and the use of artificial intelligence and machine learning to make the system 100 more efficient are provided in reference to FIGS. 4 and 5 below.

One example of a system for providing a customized user experience is described in U.S. patent application No. 63/268,935 filed on Mar. 7, 2022, the entirety of which is hereby incorporated by reference.

The example rendering module 208 is programmed to access one or more of the micro front-end components from the hub device 110 to generate the contextual interface for the user. As noted, the rendering module 208 receives input from the context configuration module 206 when generating the contextual interface.

For instance, when a user accesses the system 100, the context configuration module 206 and/or the rendering module 208 access the relevant micro front-end components from the hub and registry module 204, and the rendering module 208 generates the contextual interface. This interface can then be displayed by a client device for the user, such as the client device 104.

In some examples, the rendering module 208 is programmed to use the information from the context configuration module 206 so that the contextual interface is specific to the user or group of users. In this manner, the contextual interface can provide greater efficiencies in information and functionality for the user.

In some examples, the micro front-end components are used by the rendering module 208 to generate various aspects of the contextual interface. Examples of such aspects in the context of the financial institution example include one or more of:

(1) header—navigation header functionality is made contextual using micro front-end components;

(2) payments—functionality associated with wire payments is made contextual using micro front-end components; and (3) consolidated view of account balances—functionality associated with the display of accounts is made contextual using micro front-end components.

This is a non-exhaustive list of the many aspects of the contextual interface that can be generated by the rendering module 208 using the micro front-end components.

In some examples, the rendering module 208 is programmed to change how the contextual interface is generated over time. For instance, the rendering module 208 can initially generate an interface that is standard across all users, groups of users, etc. Over time, the rendering module 208 can receive additional information about the user from the context configuration module 206. Once sufficient context is developed, the rendering module 208 can be programmed to use the micro front-end components to generate the contextual interface for the user, thereby providing a customized, personalized interface. As noted herein, rendering by the rendering module 208 can be related to a variety of factors, and different users can get custom, personalized and contextual experiences based on those factors and their persona over time.

Further, as noted, the rendering module 208 can be programmed to experiment over time by generating different contextual interfaces for users to determine preferences, efficiencies, etc. This can assist the context configuration module 206 and the rendering module 208 in determining which contextual interface may be optimized for a particular user or group of users based upon machine learning.

Finally, the rendering module 208 can be programmed to make these changes automatically, such as by using machine learning. Further, the rendering module 208 can be programmed to allow the changes to be made manually by the user and/or developer. For instance, the system 100 can provide preferences that allow the user to select between a standard interface and the contextual interface, as desired. Many other configurations are possible.

Figure 3:
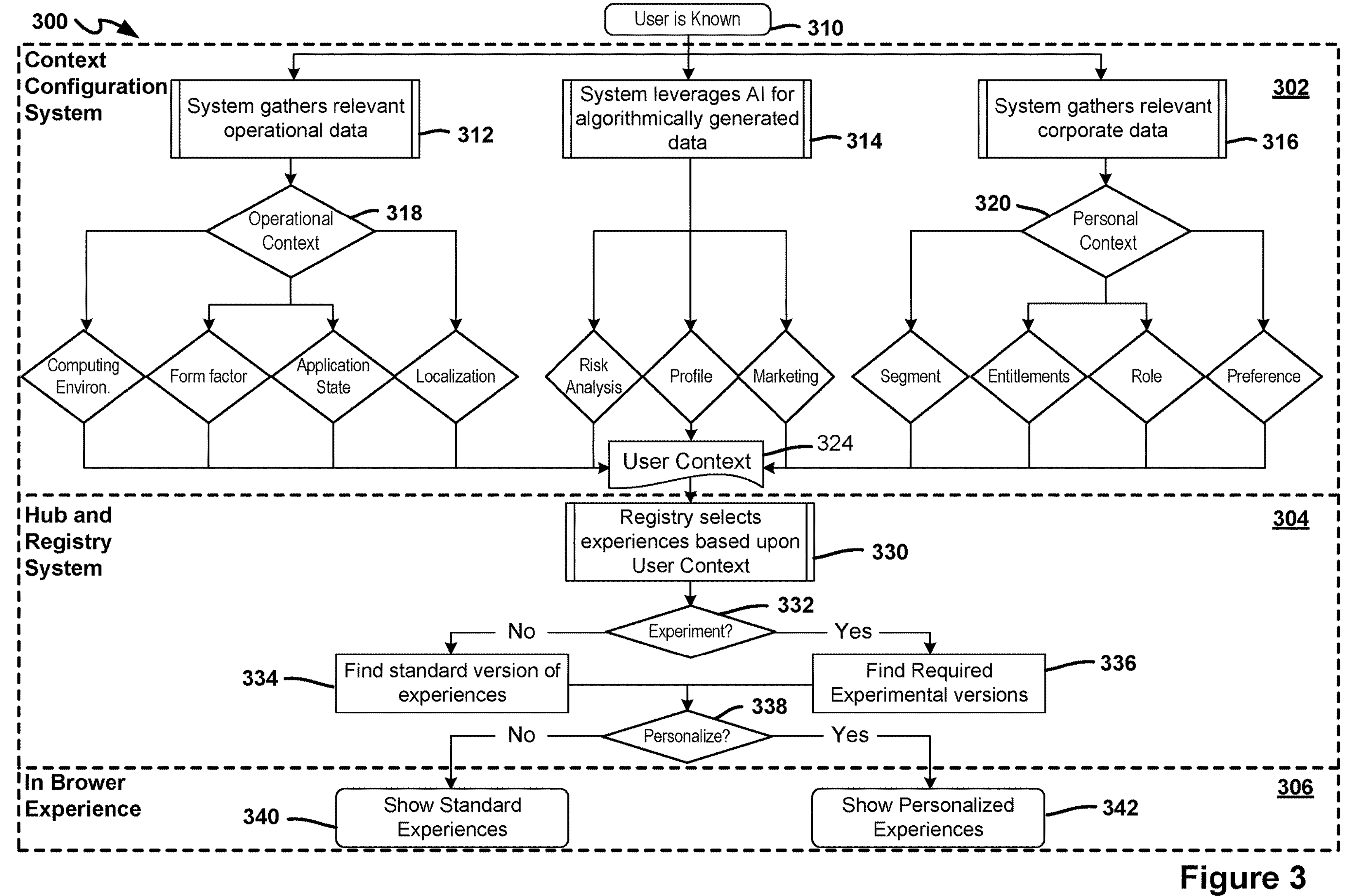
FIG. 3 shows an example method for generating a contextual interface by the server device of FIG. 2.

Referring now to FIG. 3, an example method 300 for generating the contextual interface for the user by the system 100 is shown. The example method 300 includes context configuration operations 302, hub and registry operations 304, and rendering operations 306.

In this example, the user is authenticated at operation 310. However, in other instances, the user need not be authenticated or otherwise known to generate the contextual interface.

Next, at operations 312 and 316, relevant data needed to generate the contextual interface is accessed. As noted, this relevant data can include information known about the user. The data can also include machine learning associated with the user or group of users, such as user preferences, etc.

Next, at operations 318 and 320, the information about the user is used to determine both the operational information and the personal information. As noted, these aspects are used to determine the context associated with the user so the contextual interface can be generated.

In this example, at operation 318, such information as the user's computing environment, form factor for the user' computing device, application state on the computing device, and localization based upon location can be used as operational information. Likewise, information such as the user's segment or grouping, entitlements associated with the user's stature, role, and preferences can be used as personal information.

At operation 314, the system 100 can use artificial intelligence to generate further information associated with the user. This information can relate to risks associated with the user, a profile generated for the user, and/or marketing information associated with the user, such as what products or services may be of most use to the user. Additional details on using artificial intelligence are provided in reference to FIG. 4.

Next, at operation 324, the operational and personal information and the information generating using artificial intelligence are combined to generate the contextual information associated with the user. As described further above, this contextual information is used to select the micro front-end components that are used to create the contextual interface for the user.

Next, at operation 330, the relevant micro front-end components are selected from the hub.

At operation 332, a determination is made by the system as to whether experimentation is being conducted. If so, control is passed to operation 336, and experimental aspects of the micro front-end components can be selected. If not, control is instead passed to operation 334, and standard version of the micro front-end components are selected. As noted, the experimentation can be used to determine preferences for the specific user and/or preferences for a group of users or globally for all users.

Finally, at operation 338, the system 100 determines whether to provide the contextual interface to the user. If so, control is passed to operation 342, and the contextual interface is rendered. If not, control is passed to operation 340, and a standard interface is instead rendered. As noted, the decision whether to show the contextual interface can be automated, such as by the system 100 determining if enough contextual information is known for the user. Or, the decision can be manual, such as by allowing the user to decide whether to have the contextual or standard interface shown. Many configurations are possible.

Figure 4:
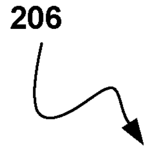
FIG. 4 shows example logical components of a context configuration module of the server device of FIG. 2.

Referring now to FIG. 4, additional details about the example context configuration module 206 are provided.

Generally, the context configuration module 206 can be programmed to create contextual experiences based upon aspects associated with a user, such as the user's personas, roles and entitlements, preferences, operations, etc. Further, the context configuration module 206 can use artificial intelligence to further individualize the contextual experiences.

For instance, a composite micro front-end can be programmed to provide a payment experience for the user, as described above. The composite micro front-end can be made-up of various sub-components. These sub-components can be assembled to create the composite micro front-end with this functionality. This assembly can be based upon various aspects, such as the context associated with the user (e.g., persona and roles) and can be driven by artificial intelligence (e.g., machine learning).

In this example, the context configuration module 206 is programmed to include an individualized context module 402, an artificial intelligence module 404, and a sub-component assembly module 406. Many other configurations are possible.

The example individualized context module 402 is programmed to capture aspects associated with the user. As noted above, these aspects can vary depending on the user.

For instance, the individualized context module 402 can be programmed to access personal information associated with the user's persona, such as a profile associated with the user. This information can include basic bibliographic information about the user, such as name, age, address, etc. The information can also include the user's account information.

The individualized context module 402 can also be programmed to access information associated with the user's roles and entitlements. This can include, for instance, the user's title within an organization. This can also include information associated with the user's responsibilities, education, ability to access other systems, etc.

Further, the individualized context module 402 can be programmed to access information associated with the user's preferences and operations. In some examples, the preferences can include explicit preferences defined by the user over time, as well as indirect preferences identified by the system, such as the artificial intelligence module 404 described below. The information accessed by the individualized context module 402 can also include past activity by the user, such as the user's history or operations interacting with the system 100.

The individualized context module 402 captures this information and provides the information to the artificial intelligence module 404, which is programmed to use the information to tailor the contextual experience for the user by learning the preferences of the user.

Specifically, the example artificial intelligence module 404 is programmed to learn about the user over time and tailor the micro front-ends that are used to build an individualized experience for the user. For instance, the artificial intelligence module 404 can consume the information from the individualized context module 402 and use this information to tailor a contextual interface that is optimized for the user in terms of content and/or functionality.

The artificial intelligence module 404 can consume information about the user and determine that the user performs certain tasks based upon the user's activity and role. Over time, the artificial intelligence module 404 can learn when the user performs such functions and provide the user with the necessary interfaces to become more efficient.

The artificial intelligence module 404 can utilize rules and parameters associated with the micro front-ends in order to create this individualized experience. For instance, as described herein, the artificial intelligence module 404 identify certain micro front-end functionality to be provided to the user when the user accesses a contextual interface on the client device 104.

Specifically, the example sub-component assembly module 406 is programmed to receive parameters from the artificial intelligence module 404 to build the individualized experience. For instance, the sub-component assembly module 406 can select certain micro front-ends when building a contextual interface for the user based upon the parameters provided by the artificial intelligence module 404. Further, the sub-component assembly module 406 can select certain sub-components of a composite micro front-end when building the contextual interface based upon the parameters provided by the artificial intelligence module 404.

Figure 5:
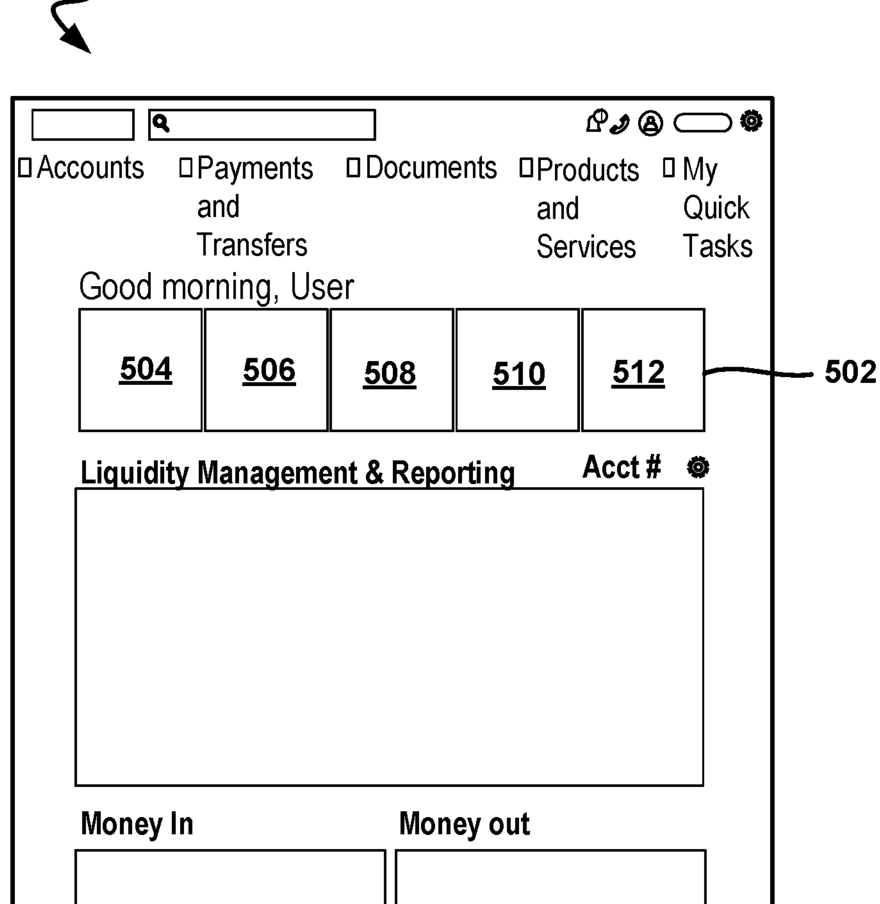
FIG. 5 shows an example contextual interface generated by the server device of FIG. 2.

For instance, an example contextual interface 500 is shown in FIG. 5. As previously noted, the information and functionality associated with the contextual interface 500 is configured to provide the user with a personalized experience that increases the efficiencies for the user.

In this example, the contextual interface 500 illustrates a user interface including a composite micro front-end 502. This micro front-end 502 can provide functionality identified by the artificial intelligence module 404 as being useful for the user. In the example, the micro front-end 502 includes a plurality of sub-component slots 504, 506, 508, 510, 512. The sub-component assembly module 406 can use the information from the artificial intelligence module 404 to populate those slots with sub-components of the micro front-end 502 that are most beneficial to the user.

For instance, the sub-component assembly module 406 can use the information and rules defined for the contextual interface 500 to populate the sub-component slots 504, 506, 508, 510, 512 with individualized functionality for the user. For instance, the sub-component assembly module 406 can populate the slot 504 with a sub-component of the micro front-end 502 that allows for scheduling a payment, while the slot 506 can be populated with a sub-component of the micro front-end 502 that allows for defining a reoccurrence of a payment.

More specifically, the sub-component assembly module 406 uses collections of rules and applicable template definitions, which describe how to compose experiences. For instance, a micro front-end A can be dependent upon micro front-end B, so that a rule requires both must be included when one is included.

In another example, a micro front-end payment dashboard can include a particular template layout with three visible and rotating carousel slots. These slots can be tied to payment-related micro front-ends, and the associated modalities can only be tiles and buttons. In yet another example, a rule can require all pages to include a micro front-end header and a micro front-end footer for a consistent layout. In yet a further embodiment, a micro front-end payment dashboard can include a template that defines a first micro front-end with payment insights at a first location of the page, and rules defining micro front-ends relating to payments (e.g., wire approvals, such as an incremented count of what's outstanding to approve for administrators).

In another example, a micro front-end profile can be included as a button within the micro front-ends. Further, a template can define certain control functions, such as tile, button, and/or chatbox entry modalities. The templates can also define layouts, sizing, dependencies, affected users, channels, branding, etc. Many other configurations are possible.

In addition, information associated with the sub-components can be pre-populated. For instance, an amount and schedule for payment can be pre-populated in the slot 504 based upon the contextual information known about the user, such as when the user likes to make the payment and the typical payment amount (e.g., minimum payment balance, pay in full, etc.).

The sub-component assembly module 406 selects appropriate sub-components to fill the slots 504, 506, 508, 510, and 512 of the micro front-end 502 so that the functionality associated with the micro front-end 502 is individualized for the user. The sub-component assembly module 406 selects the appropriate slot of the micro front-end 502 based upon the configuration of the sub-component, such as the size, functionality, etc. Many other configurations are possible.

Additional examples of such interfaces are provided in U.S. patent application Ser. No. 17/663,572. Many other configurations are possible.

Figure 6:
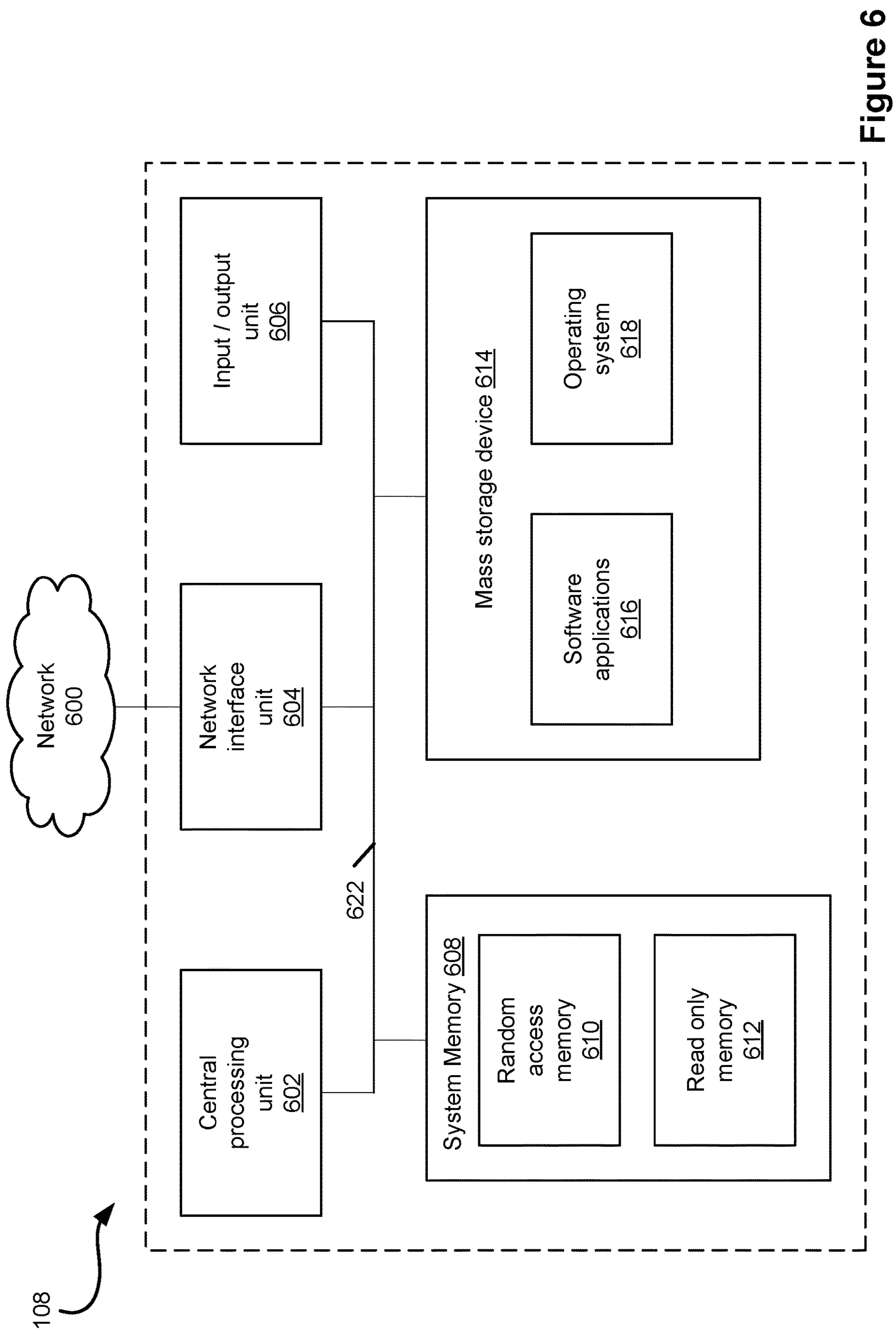
FIG. 6 shows example components of the server device of FIG. 2.

FIG. 6 schematically shows example physical components of portions of the system 100 of FIG. 1. In particular, additional components of the server device 108 are illustrated. In this example, the server device 108 provides the computing resources to perform the functionality associated with the system 100. The other computing devices associated with the system 100 can be similarly configured.

The server device 108 can be an internally controlled and managed device (or multiple devices) of the business enterprise, e.g., the financial institution. Alternatively, the server device 108 can represent one or more devices operating in a shared computing system external to the enterprise or institution, such as a cloud. Via a network 600, the components of the system 100 that are physically remote from one another can interact with one another.

The server device 108 includes a central processing unit or processor 602, a system memory 608, and a system bus 622 that couples the system memory 608 to the processor 602.

The system memory 608 includes a random access memory ("RAM") 610 and a read-only memory ("ROM") 612. A basic input/output system that contains the basic routines that help to transfer information between elements within the server device 108, such as during startup, is stored in the ROM 612.

The server device 108 further includes a mass storage device 614. The mass storage device 614 is able to store software instructions and data.

The mass storage device 614 is connected to the processor 602 through a mass storage controller (not shown) connected to the system bus 622. The mass storage device 614 and its associated computer-readable data storage media provide non-volatile, non-transitory storage for the server device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 108.

According to various embodiments of the invention, the server device 108 may operate in a networked environment using logical connections to remote network devices through the network 600, such as a wireless network, the Internet, or another type of network. The server device 108 may connect to the network 600 through a network interface unit 604 connected to the system bus 622. It should be appreciated that the network interface unit 604 may also be utilized to connect to other types of networks and remote computing systems. The server device 108 also includes an input/output unit 606 for receiving and processing input from a number of other devices, including a touch user interface display screen, an audio input device, or another type of input device. Similarly, the input/output unit 606 may provide output to a touch user interface display screen or other type of output device.

As mentioned briefly above, the mass storage device 614 and/or the RAM 210 of the server device 108 can store software instructions and data. The software instructions include an operating system 618 suitable for controlling the operation of the server device 108. The mass storage device 614 and/or the RAM 210 also store software instructions and applications 616, that when executed by the processor 602, cause the server device 108 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:

at least one processor; and non-transitory computer-readable storage storing instructions that, when executed by the at least one processor, cause the system to:

provide an individualized contextual module programmed to capture individual information associated with a user, the individual information including personal information about the user;

provide an artificial intelligence module programmed to:

monitor user interaction patterns with a plurality of micro front-end components;

use machine learning to identify trends in the user interaction patterns;

learn about preferences of the user over time using artificial intelligence based on the trends in the user interaction patterns;

identify, based on the trends in the user interaction patterns, first micro front-end components with which the user frequently interacts and second micro front-end components that the user cancels, hides, or removes from a contextual interface; and use the artificial intelligence to tailor an experience for the user based upon the personal information and the preferences; and provide a sub-component assembly module programmed to:

select one or more slots of a micro front-end within an addressable micro front-end hierarchy defined by a template layout including one or more sub-component slots;

select sub-components for the one or more sub-component slots of the micro front-end based upon the experience identified by the artificial intelligence to generate the micro front-end based upon the template layout to generate the contextual interface for the user;

surface, within the contextual interface at a position determined based on the user interaction patterns, first sub-components of the sub-components corresponding to the first micro front-end components;

suppress, from the contextual interface, second sub-components of the sub-components corresponding to the second micro front-end components; and dynamically repopulate the one or more sub-component slots with different sub-components as the artificial intelligence module modifies the preferences over time based upon learning more about the user, thereby reducing computational overhead and improving interface rendering efficiency by loading contextually relevant sub-components.

2. The system of claim 1, wherein the personal information and the preferences are associated with financial services.

3. The system of claim 1, wherein at least one of the sub-components is selected based upon rules associated with defining the contextual interface.

4. A method, comprising:

providing an individualized contextual module programmed to capture individual information associated with a user, the individual information including personal information about the user;

providing an artificial intelligence module programmed to:

monitor user interaction patterns with a plurality of micro front-end components;

use machine learning to identify trends in the user interaction patterns;

learn about preferences of the user over time using artificial intelligence based on the trends in the user interaction patterns;

identify, based on the trends in the user interaction patterns, first micro front-end components with which the user frequently interacts and second micro front-end components that the user cancels, hides, or removes from a contextual interface; and use the artificial intelligence to tailor an experience for the user based upon the personal information and the preferences; and providing a sub-component assembly module programmed to:

select one or more slots of a micro front-end within an addressable micro front-end hierarchy defined by a template layout including one or more sub-component slots;

select sub-components for the one or more sub-component slots of the micro front-end based upon the experience identified by the artificial intelligence to generate the micro front-end based upon the template layout to generate the contextual interface for the user;

surface, within the contextual interface at a position determined based on the user interaction patterns, first sub-components of the sub-components corresponding to the first micro front-end components;

suppress, from the contextual interface, second sub-components of the sub-components corresponding to the second micro front-end components; and dynamically repopulate the one or more sub-component slots with different sub-components as the artificial intelligence module modifies the preferences over time based upon learning more about the user, thereby reducing computational overhead and improving interface rendering efficiency by loading contextually relevant sub-components.

5. The method of claim 4, wherein the personal information and the preferences are associated with financial services.

6. The method of claim 4, wherein at least one of the sub-components is selected based upon rules associated with defining the contextual interface.

* * * * *